United States Patent
Jin et al.

(10) Patent No.: US 11,733,381 B2
(45) Date of Patent: Aug. 22, 2023

(54) SOUND VELOCITY PROFILE INVERSION METHOD BASED ON INVERTED MULTI-BEAM ECHO SOUNDER

(71) Applicant: ZHEJIANG UNIVERSITY, Hangzhou (CN)

(72) Inventors: Liling Jin, Hangzhou (CN); Wen Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 343 days.

(21) Appl. No.: 17/232,163

(22) Filed: Apr. 16, 2021

(65) Prior Publication Data
US 2021/0231800 A1 Jul. 29, 2021

Related U.S. Application Data

(63) Continuation of application No. PCT/CN2020/088233, filed on Apr. 30, 2020.

(30) Foreign Application Priority Data

May 16, 2019 (CN) .......................... 201910410164.4

(51) Int. Cl.
G01H 5/00 (2006.01)
G01S 15/89 (2006.01)

(52) U.S. Cl.
CPC ............... *G01S 15/89* (2013.01); *G01H 5/00* (2013.01)

(58) Field of Classification Search
CPC ............ G01H 5/00; G01S 15/88; G01S 15/89
(Continued)

(56) References Cited

U.S. PATENT DOCUMENTS

| 5,608,689 A | * | 3/1997 | Capell, Sr. .......... G01S 7/52004 367/87 |
| 2010/0302907 A1 | * | 12/2010 | Brumley ................... G01S 5/22 367/89 |
| 2015/0309173 A1 | | 10/2015 | Shiba |

FOREIGN PATENT DOCUMENTS

| CN | 102749622 A | * | 10/2012 |
| CN | 102749622 A | | 10/2012 |

(Continued)

OTHER PUBLICATIONS

"Inversion of the Sound Speed with Radiated Noise of an Autonomous Underwater Vehicle in Shallow Water Waveguides", IEEE Journal of Oceanic Engineering, vol. 41, No. 1, Jan. 2016 (Year: 2016).*

(Continued)

*Primary Examiner* — Yuqing Xiao
*Assistant Examiner* — Christopher Richard Walker
(74) *Attorney, Agent, or Firm* — W&G Law Group (57) ABSTRACT

A sound velocity profile inversion method based on an inverted multi-beam echometer. Said method comprises the following steps: mounting, in an inverted manner, the multi-beam echometer on an underwater submerged buoy or fixing same to a water bottom, transmitting a beam to a water surface by means of a transmitting transducer array, and receiving an echo signal by means of a receiving transducer array; the multi-beam echometer obtaining an angle of arrival and arrival time of an echo according to the received echo signal; solving an EOF according to sound velocity profile prior information, and obtaining a dimension reduction primary function description method of the sound velocity profile; in combination with the EOF, a ray tracing algorithm, a surface sound velocity and multi-beam data, establishing an optimization model; according to the established optimization model, the arrival time and the angle of (Continued)

arrival of the received echo and the surface sound velocity, using an optimization algorithm to obtain an estimation result of the sound velocity profile of a measurement area; and further, calculating a water temperature profile of the measurement area by using an estimated value of the sound velocity profile. Said method can rapidly and accurately track fluctuations of the sound velocity profile and the temperature profile.

10 Claims, 3 Drawing Sheets

(58) Field of Classification Search
USPC .......................................................... 367/87
See application file for complete search history.

(56) References Cited

FOREIGN PATENT DOCUMENTS

| CN | 104181523 | A | | 12/2014 | |
|---|---|---|---|---|---|
| CN | 105403860 | A | | 3/2016 | |
| CN | 105487046 | A | | 4/2016 | |
| CN | 105911551 | A | * | 8/2016 | ............... G01H 5/00 |
| CN | 105911551 | A | | 8/2016 | |
| CN | 106950568 | A | | 7/2017 | |
| CN | 106950568 | B | * | 8/2018 | ............... G01H 5/00 |
| CN | 110146895 | A | | 8/2019 | |
| JP | 2012083111 | A | | 4/2012 | |

OTHER PUBLICATIONS

CN-102749622-A (Machine Translation) (Year: 2012).*
CN-106950568-B (Machine Translation) (Year: 2018).*
CN-105911551-A (Machine Translation) (Year: 2016).*
First Office Action (2019104101644); dated Sep. 25, 2020.
Sparse-increment Iteration-based Sound Velocity Profile Estimation with Multi-beam Bathymetry Systems; Date of Mailing: Dec. 31, 2012.
Inversion of Sound Velocity Profiles by Correcting the Terrain Distortion; Date of Mailing: Mar. 31, 2016.
International Search Report (PCT/CN2020/088233); dated Mar. 3, 2020.
"Application of sound velocity profile interpolation methods in multibeam echosounding" (Apr. 30, 2017) [Yan Xunpeng et al.].
"Sound velocity profile estimation using ray tracing and nature inspired meta-heuristic algorithms in underwater sensor networks" (Sep. 28, 2019) [K. M. Mridula et al.].

* cited by examiner

SOUND VELOCITY PROFILE INVERSION METHOD BASED ON INVERTED MULTI-BEAM ECHO SOUNDER

This application is a national stage of International Application No. PCT/CN2020/088233, filed on Apr. 30, 2020, which claims priority to Chinese Patent Application No. 201910410164.4, filed on May 16, 2019. Both of the aforementioned applications are hereby incorporated by reference in their entireties.

TECHNICAL FIELD

The present disclosure relates to the technical field of underwater acoustic measurement and signal information processing, and in particular, to a sound velocity profile inversion method based on an inverted multi-beam echo sounder.

BACKGROUND

A typical ocean system is a complex system composed of many interacted mechanisms such as physical, acoustic, optical, biological, chemical and geological processes. Various forms of dynamic processes exist in the ocean system. These dynamic processes and coupling therebetween, together with interactions with the seabed, lead to inhomogeneity within the ocean and significant changes in time and space. Among many environmental parameters, a sound velocity profile has obvious time-varying characteristics, which has an important influence on acoustic signal propagation and further affects working performance of sonar systems such as underwater acoustic communication, positioning and mapping. An effective measurement technology for ocean environments has always been concerned, which is a main direction of current underwater acoustic research.

At present, there are mainly two methods for obtaining a sound velocity profile, namely a measurement method and an inversion method. In the direct measurement method, a Conductivity Temperature Depth (CTD) system is used to obtain the sound velocity profile by means of point-by-point measurement. Although this method has very high measurement accuracy, direct measurement is not only time-consuming and laborious, but also unable to obtain observation data of dynamic changes in a large range of sea areas. Thus, it is difficult to meet requirements of practical application. In recent years, an acoustic inversion technology provides a long-term, rapid and efficient method to obtain environmental parameters of interest by combining a sound propagation model with observation data, which has great advantages over traditional methods.

In a measurement process of the multi-beam echo sounder, a special beam transmitting and receiving structure is used to form many narrower beams in a wide range, so as to obtain echo information of water in a wide range at one time. The multi-beam echo sounder adopts an orthogonal "T"-type transmitting and receiving array structure. The transmitting array is arranged along a ship's sailing direction, to form a transmitting beam with a narrower distance in a longitudinal direction (along the sailing direction) and a wider distance in a transverse direction (perpendicular to the sailing direction), so as to form a measurement band. The receiving array is arranged laterally, and many beams with a narrower distance in a transverse direction and a wider distance in a longitudinal direction are formed by means of receiving beamforming processing. Many measurement points (footprints) are formed by intersections of the receiving beam and the transmitting beam. The whole measurement value is calculated by using the time of arrival and an angle of arrival of each footprint echo. In recent decades, a sounding technology with a multi-beam echo sounder has been developed rapidly, and has become one of the main means of underwater survey, playing an extremely important role in ocean engineering construction, resource development, chart drawing, ocean research and rights protection. In application to sounding, in order to ensure the measurement accuracy, data needs to be modified by a sound velocity profile, and the data includes information of the sound velocity profile. Data of the multi-beam echo sounder is used for inversion of hydrologic parameters such as sound velocity and temperature. Thus, water environment information is obtained while the accuracy of topographic survey is improved, which reflects a deep coupling relationship between vertical sound field and dynamic force.

An inverted echo sounder is fixed on the bottom of the sea for a long time. The inverted echo sounder measures changes in the propagation time of acoustic waves in a vertical direction and inverts physical oceanographic parameters such as temperature and salinity. Such an echo sounder can be applied to deep-sea observation such as ocean circulation, mesoscale eddies and internal waves. At present, the inverted echo sounder obtains profile distribution of ocean dynamic parameters in a single beam mode through a GEM-Gravest Empirical Mode. Under deep sea conditions, the inverted echo sounder with the single beam mode has a large measurement error. In addition, in consideration of complex thermocline structures and spatiotemporal variation environments in the shallow sea, the application of the inverted echo sounder with the single beam mode is limited.

At present, the research focus is to find an inversion method which can accurately and quickly obtain time-varying characteristics of a sound velocity profile.

SUMMARY

In view of deficiencies of the conventional technology, an objective of the present disclosure is to provide a sound velocity profile inversion method based on an inverted multi-beam echo sounder and a water temperature profile inversion method based on an inverted multi-beam echo sounder.

To achieve the above objective, one technical solution adopted by the present disclosure is as follows. A sound velocity profile inversion method based on an inverted multi-beam echo sounder includes following steps:

(1) mounting the multi-beam echo sounder on an underwater submerged buoy or fixing the multi-beam echo sounder to a water bottom in an inverted manner; transmitting a beam to a water surface by a transmitting transducer array; and receiving an echo signal by a receiving transducer array;

(2) obtaining, by the multi-beam echo sounder, an angle of arrival of an echo and a time of arrival of the echo according to the received echo signal;

(3) obtaining a description method of a dimension reduction primary function of the sound velocity profile, by solving an Empirical Orthogonal Function (EOF) according to sound velocity profile prior information, wherein a sound velocity profile at a time t is expressed as:

$$c(z, t) = c_0(z) + \Delta c(z, t) \quad (1)$$

$$= c_0(z) + \sum_{i=1}^{I} \alpha_i(f)\psi_i(z).$$

where in the formula (1), z denotes a depth, $c_0(z)$ denotes an average sound velocity at the depth z, and $\Delta c(z,t)$ denotes a disturbance quantity; i denotes an order of the EOF, $1 \leq i \leq I$, I denotes the total number of orders of the EOF, $\alpha_i(t)$ denotes a coefficient of the $i^{th}$-order EOF, and $\psi_i(z)$ denotes the $i^{th}$-order EOF;

(4) establishing an optimization model in combination with the EOF, a sound ray tracing algorithm, a surface sound velocity and multi-beam data, $$\hat{\alpha}(t) = \underset{\alpha}{\operatorname{argmin}}(\|Toa_{meas}(t) - Toa_{est}(t)\|_2 + K\|c_{0meas}(t) - c_{0est}(t)\|_2), \quad (2)$$

$$Toa_{est}(t) = H[\alpha, Doa_{meas}(t)].$$

wherein the formula (2), K denotes a weight coefficient, taking a value in [0,1]; $Toa_{meas}(t)$ denotes actual measurement data of a time of arrival of each beam at a time t, $Toa_{est}(t)$ denotes an estimated value of the time of arrival of each beam at the time t, $c_{0meas}(t)$ denotes measurement data of the sound velocity at a position of the receiving transducer array of the multi-beam echo sounder at the time t, and $c_{0est}(t)$ denotes an estimated value of the sound velocity at the position of the receiving transducer array of the multi-beam echo sounder at the time t; H denotes a measurement operator, which performs a calculation according to the sound ray tracing algorithm, and $Doa_{meas}(t)$ denotes a measurement value of a direction of arrival of each beam at the time t; and (5) obtaining an inversion value of an EOF coefficient in an optimization algorithm, according to the optimization model established in step (4), the time of arrival of the echo and the angle of arrival of the echo received in step (2), and a measurement value of the sound velocity at the position of the receiving transducer array; and obtaining an estimation result of the sound velocity profile by using the formula (1).

Further, in step (5), the optimization algorithm includes a simulated annealing algorithm, a hill climbing algorithm, a particle swarm algorithm, a genetic algorithm, and an ant colony algorithm.

Another technical solution adopted by the present disclosure is as follows. A water temperature profile inversion method based on an inverted multi-beam echo sounder includes following steps:

(1) mounting the multi-beam echo sounder on an underwater submerged buoy or fixing the multi-beam echo sounder to a water bottom in an inverted manner; transmitting a beam to a water surface by a transmitting transducer array; and receiving an echo signal by a receiving transducer array;

(2) obtaining, by the multi-beam echo sounder, an angle of arrival of an echo and a time of arrival of the echo according to the received echo signal;

(3) obtaining a description method of a dimension reduction primary function of the sound velocity profile, by solving an Empirical Orthogonal Function (EOF) according to sound velocity profile prior information, wherein a sound velocity profile at a time t is expressed as:

$$c(z, t) = c_0(z) + \Delta c(z, t) \quad (3)$$

$$= c_0(z) + \sum_{i=1}^{I} \alpha_i(t)\psi_i(z).$$

where in the formula (3), z denotes a depth; $c_0(z)$ denotes an average sound velocity at the depth Z, and $\Delta c(z,t)$ denotes a disturbance quantity; i denotes an order of the EOF, $1 \leq i \leq I$, I denotes the total number of orders of the EOF, $\alpha_i(t)$ denotes a coefficient of the $i^{th}$-order EOF, and $\psi_i(z)$ denotes the $i^{th}$-order EOF;

(4) establishing an optimization model in combination with the EOF, a sound ray tracing algorithm, a surface sound velocity and multi-beam data:

$$\hat{\alpha}(t) = \underset{\alpha}{\operatorname{argmin}}(\|Toa_{meas}(t) - Toa_{est}(t)\|_2 + K\|c_{0meas}(t) - c_{0est}(t)\|_2), \quad (4)$$

$$Toa_{est}(t) = H[\alpha, Doa_{meas}(t)].$$

wherein the formula (4), K denotes a weight coefficient, taking a value in [0,1]; $Toa_{meas}(t)$ denotes actual measurement data of a time of arrival of each beam at a time t, $Toa_{est}(t)$ denotes an estimated value of a time of arrival of each beam at the time t, $c_{0meas}(t)$ denotes measurement data of the sound velocity at a position of the receiving transducer array of the multi-beam echo sounder at the time t, and $c_{0est}(t)$ denotes an estimated value of the sound velocity at the position of the receiving transducer array of the multi-beam echo sounder at the time t; H denotes a measurement operator, which performs a calculation according to the sound ray tracing algorithm, and $Doa_{meas}(t)$ denotes a measurement value of a direction of arrival of each beam at the time t;

(5) obtaining an inversion value of an EOF coefficient in an optimization algorithm, according to the optimization model established in step (4), the time of arrival of the echo and the angle of arrival of the echo received in step (2), and a measurement value of the sound velocity at the position of the receiving transducer array; and obtaining an estimation result of the sound velocity profile by using the formula (3); and (6) calculating a water temperature profile of a measurement area according to an estimation value of the sound velocity profile in step (5).

Further, in step (5), the optimization algorithm includes a simulated annealing algorithm, a hill climbing algorithm, a particle swarm optimization algorithm, a genetic algorithm, and an ant colony algorithm.

Further, in step (6), the water temperature profile of the measurement area is calculated by using a Mackenzie formula for a sound velocity, a Chen-Millero-Li formula for the sound velocity, a Dell Grosso formula for the sound velocity, a Leroy formula for the sound velocity, a Wilson accurate formula for the sound velocity, a simplified Wilson formula for the sound velocity, or a simplified EM Hierarchical formula for the sound velocity.

Compared with the conventional technology, the present disclosure has the following beneficial effects:

(1) In the method of the present disclosure, measurement data (time of arrival and an angle of arrival) of the inverted multi-beam echo sounder is directly used to estimate an sound velocity profile of a measurement area, and can further obtain a water temperature profile of the measurement area, which has a faster speed than the method of directly placing CTD.

(2) An inverted multi-beam echo sounder is adopted in the present disclosure to obtain tens or even hundreds of narrow beams at the same time, which has higher ocean environment estimation accuracy than a single-beam echo sounder.

(3) The inverted multi-beam echo sounder is adopted in the present disclosure to estimate environmental parameters (a sound velocity profile and a water temperature profile), which can be mounted on the bottom or on a submerged buoy or a buoy. Thus, the inverted multi-beam echo sounder can satisfy the safety, and implement large-scale, long-term timing and dynamic monitoring on ocean environments.

(4) In the present disclosure, the inverted multi-beam echo sounder is mounted on a submerged buoy, which can estimate environmental parameters from a mounting position of the submerged buoy to the water surface. Thus, the problem that hydrological parameters of a sea surface cannot be measured in the traditional submerged buoy is solved, which is of great benefit to observation and application of the submerged buoy.

DESCRIPTION OF EMBODIMENTS

The present disclosure is specifically described in further detail as follows with reference to the accompanying drawings and embodiments.

Figure 1:
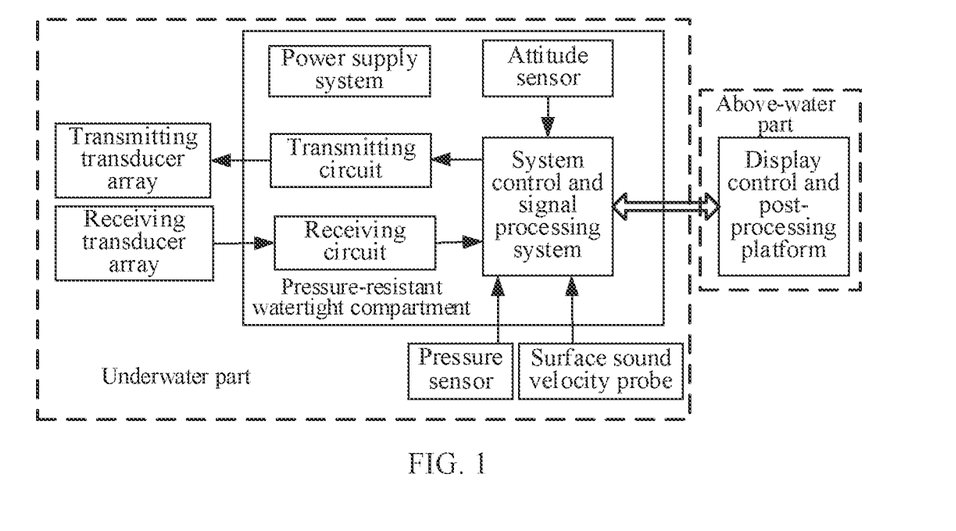
FIG. 1 is a structural block diagram of a multi-beam echo sounder.

As shown in FIG. 1, a multi-beam echo sounder includes the followings.

A transmitting circuit is configured to generate a transmission electrical signal to be transmitted.

A transmitting transducer array is configured to convert the generated transmission electrical signal into an acoustic signal for transmission.

A receiving transducer array is configured to receive an echo reflected and scattered by water and a water surface, and convert an echo acoustic signal into an electrical signal.

A receiving circuit is configured to pre-process such as amplify and filter the electrical signal obtained by a conversion of the receiving transducer array.

An attitude sensor is configured to determine an attitude of the multi-beam echo sounder.

A pressure sensor is configured to measure a pressure on the multi-beam echo sounder.

A surface sound velocity probe is configured to determine a sound velocity at a mounting position of the multi-beam echo sounder.

A system control and signal processing system is configured to implement high-speed collection and real-time processing of signals, and transmit collected data and processing results to a display control and post-processing platform via a network, wherein the collected data includes attitude sensor data, pressure sensor data and surface sound velocity data; and the processing results include an angle of arrival of the echo and a time of arrival of the echo.

A display control and post-processing platform is configured to issue an instruction to the system control and signal processing system, and receive the processing results and collected data from the system control and signal processing system; invert a sound velocity profile, by using an optimization model established on the processing results and collected data, and further calculate a water temperature profile of a measurement area by using an estimated value of the sound velocity profile.

Figure 2:
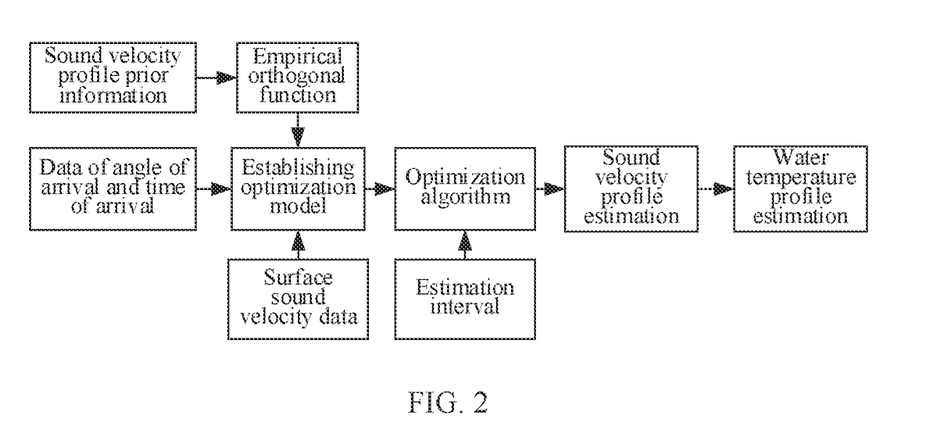
FIG. 2 is a schematic flowchart of an inversion method according to the present disclosure.

A flow of the sound velocity profile inversion method based on an inverted multi-beam echo sounder according to the present disclosure is as shown in FIG. 2. The sound velocity profile inversion method includes following steps.

(I) The multi-beam echo sounder is mounted on an underwater submerged buoy or fixed to a water bottom in an inverted manner; and is configured to transmit a beam to a water surface by a transmitting transducer array, and receive an echo signal by a receiving transducer array.

(II) The multi-beam echo sounder obtains an angle of arrival of an echo and a time of arrival of the echo according to the received echo signal.

(III) A description method of a dimension reduction primary function of the sound velocity profile is obtained, by solving an EOF according to sound velocity profile prior information.

The EOF may be calculated according to a sample set of known sound velocity profile in a measured sea area. It is assumed that there is sound velocity profile data actually measured M times, for example:

$$C = \begin{bmatrix} c_1(z_1) & c_2(z_1) & \cdots & c_M(z_1) \\ c_1(z_2) & c_2(z_2) & \cdots & c_M(z_2) \\ \vdots & \vdots & \vdots & \vdots \\ c_1(z_{N_z}) & c_2(z_{N_z}) & \cdots & c_M(z_{N_z}) \end{bmatrix}. \tag{5}$$

In the formula (5), $z_i$ is a depth value. Then, a determined value of the sound velocity is:

$$c_0(z) = \frac{1}{M} \sum_{m=1}^{M} c_m(z), \tag{6}$$

A covariance matrix is $$R = \frac{1}{M-1} \sum_{m=1}^{M} [c_m - c_0][c_m - c_0]^T. \tag{7}$$

Finally, eigenvalue decomposition is performed on the covariance matrix to obtain an expansion coefficient $\{\lambda_i\}_{i=1}^{I}$ and a corresponding eigenvector $\{u_i\}_{i=1}^{I}$. This set of orthogonal vectors corresponds to the EOF, namely $\{\psi_i\}_{i=1}^{I}$.

(IV) An optimization model is established in combination with the EOF, a sound ray tracing algorithm, a surface sound velocity and multi-beam data.

The measurement operator H in the optimization model may be calculated according to the sound ray tracing algorithm.

Figure 3:
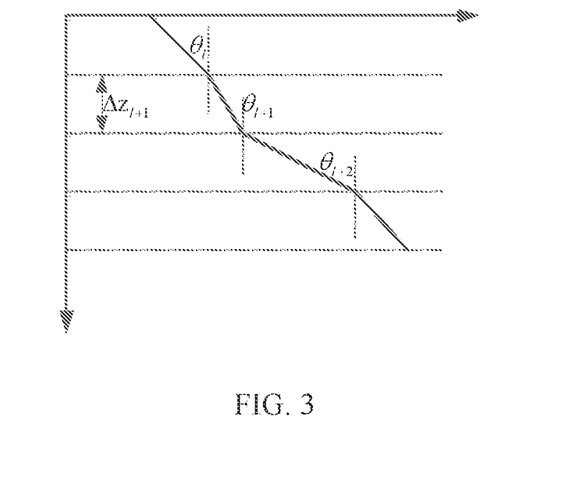
FIG. 3 is a schematic diagram of a sound ray tracing algorithm for constant sound velocity.

Because of the heterogeneity and anisotropy of seawater, sound waves may be refracted when they travel through different sound velocity layers, causing rays to bend, as shown in FIG. 3. In the case of inhomogeneous media, it is assumed that the sound velocity changes only in a vertical direction and is uniform in a horizontal direction. The sound ray propagation follows Snell's theorem:

$$\frac{\sin\theta}{c_0} = \frac{\sin\theta(z)}{c(z)} \equiv a. \tag{8}$$

In the formula (8), $c_0$ denotes a sound velocity at a position of a transducer array, referred to as a surface sound velocity; $\theta$ denotes an angle between a beam echo and the vertical direction when the beam echo reaches the receiving array; $c(z)$ denotes a sound velocity at the depth z, and $\theta(z)$ denotes an angle between a tangent to the sound ray and the vertical direction at the depth z. It is assumed that a horizontal distance dr, a vertical distance dz and a path length ds of the sound ray propagation within a short period of time dt satisfy:

$$dr = \tan\theta(z)dz, \tag{9}$$

$$ds = \frac{dz}{\cos\theta(z)},$$

$$dt = \frac{ds}{c(z)} = \frac{dz}{c(z)\cos\theta(z)},$$

The propagation time of the sound ray emitted by the transducer array and reaching at the depth z is:

$$t = \int_{z_0}^{z} dt = \int_{z_0}^{z} \frac{1}{c(z)\sqrt{1-a^2c^2(z)}} dz, \tag{10}$$

and the horizontal distance of the sound ray propagation is:

$$r = \int_{z_0}^{z} dr = \int_{z_0}^{z} \frac{ac(z)}{\sqrt{1-a^2c^2(z)}} dz. \tag{11}$$

In the formula (11), $z_0$ is a depth of the transducer array.

Because of the complexity and variability of ocean environment, it is difficult to represent the sound velocity profile $c(z)$ as a simple continuous function. The whole water body is divided into several layers according to actually measured depths of measurement points of the sound velocity profile, as shown in FIG. 3. A sound ray tracing calculation is performed with an assumption of in-layer equal gradient.

Firstly, the water body is divided into N layers in the depth direction. It is assumed that a depth and a sound velocity at a hierarchical position are respectively $z=[z_0, z_1, \ldots, z_N]^T$ and $c=[c_0, c_1, \ldots, c_N]^T$, and it is assumed that the in-layer sound velocity has constant gradient, namely $$c(z) = c_i + g_i(z - z_i). \tag{12}$$

In the formula (12), i is the number of layer (i=0, 2, ..., N−1), $c_i$ is a sound velocity value at a boundary of the $i^{th}$ layer, $z_i$ is a depth of the $i^{th}$ layer, $g_i$ is a gradient of the sound velocity in the $i^{th}$ layer, and $$g_i = \frac{c_{i+1} - c_i}{z_{i+1} - z_i}.$$

It can be known according to the formula (10) that on the assumption of the in-layer constant gradient, the round trip propagation time of the sound ray in the $i^{th}$ layer may be expressed as:

$$t_i = \frac{2}{g_i} \ln\left[\frac{c_{i+1}\left(1+\sqrt{1-a^2c_i^2}\right)}{c_i\left(1+\sqrt{1-a^2c_{i+1}^2}\right)}\right]. \tag{13}$$

It can be known according to the formula (11) that a horizontal distance of sound ray propagation in the $i^{th}$ layer may be expressed as:

$$r_i = -\frac{1}{ag_i}\left(\sqrt{1-a^2c_{i+1}^2} - \sqrt{1-a^2c_i^2}\right), \tag{14}$$

In the whole depth range, relations between the total propagation time of sound rays and the depth and between the horizontal distance of sound rays and the depth may be expressed as:

$$t(z,\theta) = \begin{cases} \text{for } z_0 \le z \le z_1: \\ \frac{2}{g_0}\left(\ln\left[\frac{c(z)}{1+\sqrt{1-a^2c(z)^2}}\right] - \ln\left[\frac{c_0}{1+\sqrt{1-(\sin\theta)^2}}\right]\right) \\ \text{for } z_i \le z < z_{i+1}, i=1,2,\ldots,N-1: \\ \sum_{n=0}^{i-1} t_n + \frac{2}{g_i}\left(\ln\left[\frac{c(z)}{1+\sqrt{1-a^2c(z)^2}}\right] - \ln\left[\frac{c_i}{1+\sqrt{1-(a^2c_i^2)}}\right]\right) \end{cases} \tag{15}$$

$$r(z,\theta) = \begin{cases} \text{for } z_0 \le z \le z_1: \\ \frac{-1}{ag_0}\sqrt{1-a^2c(z)^2} - \sqrt{1-(\sin\theta)^2}, \\ \text{for } z_i \le z < z_{i+1}, i=1,2,\ldots,N-1: \\ \sum_{n=0}^{i-1} r_n + \frac{-1}{ag_i}\left(\sqrt{1-a^2c(z)^2} - \sqrt{1-(a^2c_i^2)}\right). \end{cases} \tag{16}$$

The measurement operator H in the formula (2) for the optimization model is obtained on the basis of the formula (15).

(V) According to the established optimization model, data of an angle of arrival of the echo and a time of arrival of the echo as well as data of collected attitude, pressure and surface sound velocity are transmitted to the display control and post-processing platform through the network, and inversion of coefficients of the sound velocity profile primary function EOF is obtained in an optimization algorithm.

Figure 4:
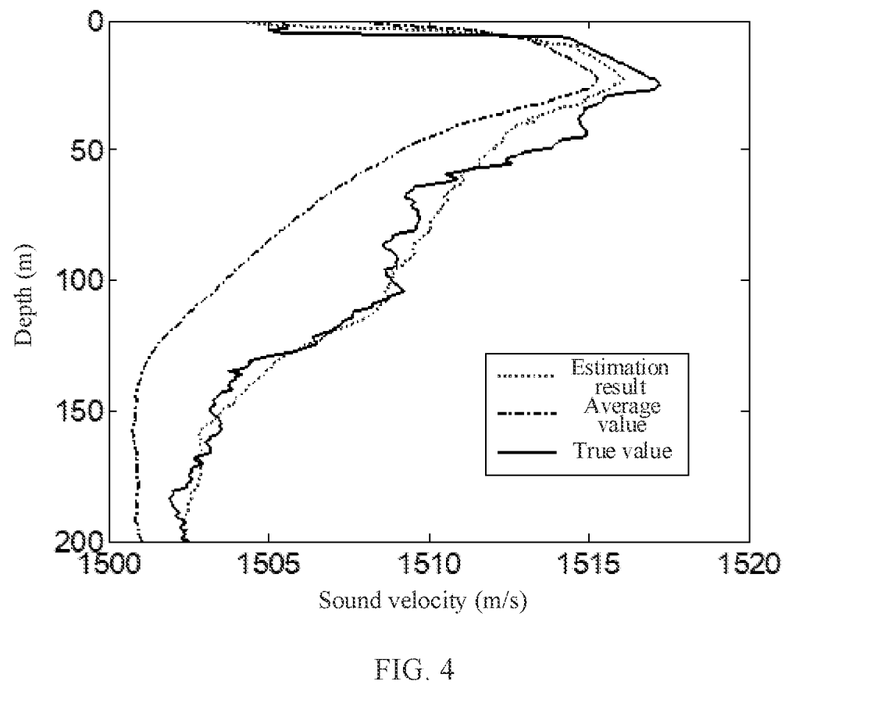
FIG. 4 is a comparison diagram of estimation results and true values of a sound velocity profile obtained with an inversion method according to the present disclosure.

In general, the optimization algorithm such as a simulated annealing algorithm, a hill climbing algorithm, a particle swarm optimization algorithm, a genetic algorithm or an ant colony algorithm can be used to estimate to-be-estimated parameters. FIG. 4 shows a simulation example of genetic algorithm in Matlab software. The number of orders of EOFs is 3. In the genetic algorithm, a lower limit of parameter estimation is [−100 −100 −100], an upper limit of parameter estimation is [100 100 100] the population number is 200, and the number of iterations is 100. As can be seen from FIG. 4, the sound velocity profile estimated by the method according to the present disclosure is very close to the real profile, and a mean square error of the whole profile is 0.9726 m/s, indicating that the method according to the present disclosure has a good estimation effect.

(VI) A water temperature profile of a measurement area is calculated according to an estimated value of the sound velocity profile in step (5).

The water temperature profile of the measurement area can be further calculated, according to the estimation result of the sound velocity profile in step (5) by using an empirical formula for sound velocity applicable to the measurement area. At present, generally accepted empirical formulas for sound velocity mainly includes a Mackenzie formula for the sound velocity, a Chen-Millero-Li formula for the sound velocity, a Dell Grosso formula for the sound velocity, a Leroy formula for the sound velocity, a Wilson accurate formula for the sound velocity, a simplified Wilson formula for the sound velocity, and an simplified EM Hierarchical formula for the sound velocity. The simplified EM Hierarchical formula for the sound velocity has a simple structure and high calculation accuracy, and can be applied to measurement areas with a wide range of seawater salinity, depth or temperature change. Thus, the simplified EM Hierarchical formula for the sound velocity is a preferred implementation method of the present disclosure.

In the following, the water temperature profile is calculated by taking the simplified EM Hierarchical formula for the sound velocity as an example.

The simplified EM Hierarchical formula for the sound velocity may be expressed as the following formulas.

A calculation formula of a surface sound velocity is $$c(T,0,S)=1449.05+T[4.57-T(0.0521-0.00023T)]+[1.33-T(0.0126-0.00009T)](S-35). \quad (17)$$

When the depth of fresh water reaches 200 m and the depth of seawater reaches 1000 m, the sound velocity calculation formula is $$c(T,z,S)=c(T,0,S)+16.5z. \quad (18)$$

When the depth of fresh water reaches 2000 m and the depth of seawater reaches 11000 m, the sound velocity calculation formula is $$c(T,z,S)=c(T,0,S)+z[16.3+z(0.22-0.003z\sqrt{T+2})]. \quad (19)$$

When the depth is greater than 5000 m, a latitude correction should be taken into account in the calculation formula of the sound velocity:

$$c(T,z,S)=c(T,0,S)+z'[16.3+z'(0.22-0.003z'\sqrt{T+2})]. \quad (20)$$

$$z'=z(1-0.0026\cos(2\varphi)). \quad (21)$$

In the formulas (17)-(21), T denotes a seawater temperature; z denotes a seawater depth; S denotes seawater salinity; p denotes a latitude of the calculated position; c(T,z,S) denotes a sound velocity when the seawater temperature is T, the seawater depth is z, and the seawater salinity is S; and the depth z is in units of km.

Figure 5:
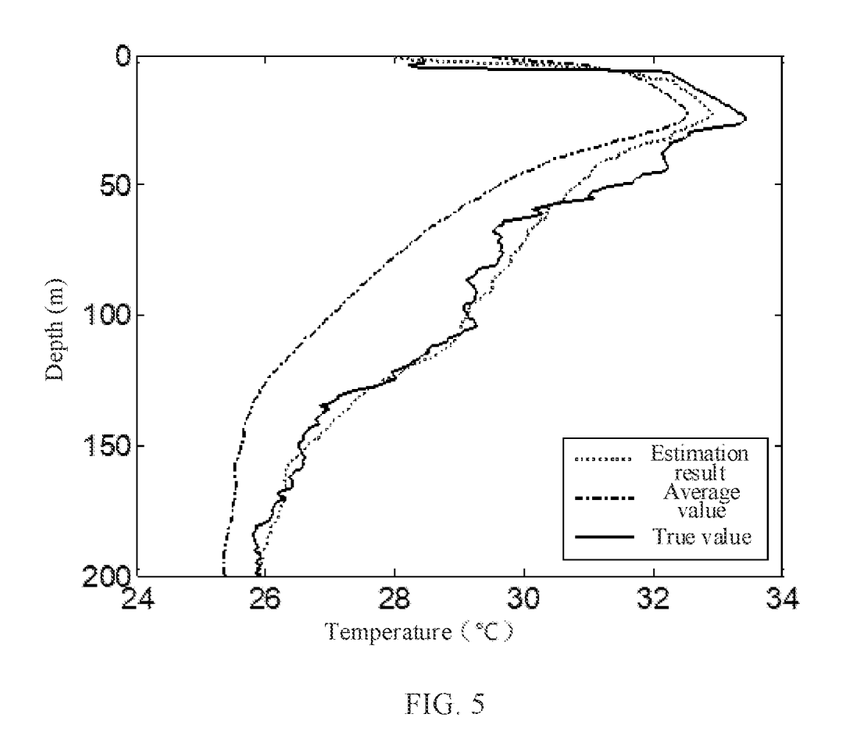
FIG. 5 is a comparison diagram of estimation results and true values of a water temperature profile obtained with an inversion method according to the present disclosure.

A depth of a placement position of the measuring system can be determined according to data of the pressure sensor. According to the applicable range of the seawater depth of formulas (17)-(20), an appropriate formula can be selected to estimate the water temperature profile. In the simulation example, the system is placed at a depth of about 200 m, and thus the formula (17) is selected to estimate the water temperature profile of the measurement area, as shown in FIG. 5. As can be seen from FIG. 4, the water temperature profile estimated by the method according to the present disclosure is very close to the real profile, which indicates that the estimation effect of the method according to the present disclosure is good.

The above embodiments are used to explain the present disclosure and but not intended to limit the present disclosure. Within the protection scope of the spirit and claims of the present disclosure, any modifications and changes made to the present disclosure all fall into the protection scope of the present disclosure.

What is claimed is:

1. A sound velocity profile inversion method based on an inverted multi-beam echo sounder, comprising following steps:

(1) mounting the multi-beam echo sounder on an underwater submerged buoy or fixing the multi-beam echo sounder to a water bottom in an inverted manner; transmitting a beam to a water surface by a transmitting transducer array; and receiving an echo signal by a receiving transducer array;

(2) obtaining, by the multi-beam echo sounder, an angle of arrival of an echo and a time of arrival of the echo according to the received echo signal;

(3) obtaining a description method of a dimension reduction primary function of the sound velocity profile, by solving an Empirical Orthogonal Function (EOF) according to sound velocity profile prior information, wherein a sound velocity profile at a time t is expressed as:

$$c(z, t) = c_0(z) + \Delta c(z, t) \quad (1)$$

$$= c_0(z) + \sum_{i=1}^{I} \alpha_i(t)\psi_i(z)$$

where in the formula (1), z denotes a depth, $c_0(z)$ denotes an average sound velocity at the depth z, and $\Delta c(z\ t)$ denotes a disturbance quantity; i denotes an order of the EOF, $1 \leq i \leq I$, I denotes the total number of orders of the EOF, $\alpha_i(t)$ denotes a coefficient of the $i^{th}$-order EOF, and $\psi_i(z)$ denotes the $i^{th}$-order EOF;

(4) establishing an optimization model in combination with the EOF, a sound ray tracing algorithm, a surface sound velocity and multi-beam data, $$\hat{\alpha}(t) = \underset{\alpha}{\mathrm{argmin}}(\|Toa_{meas}(t) - Toa_{est}(t)\|_2 + K\|c_{0meas}(t) - c_{0est}(t)\|_2) \quad (2)$$

$$Toa_{est}(t) = \mathcal{H}[\alpha, Doa_{meas}(t)]$$

where in the formula (2), K denotes a weight coefficient, $Toa_{meas}(t)$ denotes actual measurement data of a time of arrival of each beam at a time t, $Toa_{est}(t)$ denotes an estimated value of the time of arrival of each beam at the time t, $c_{0meas}(t)$ denotes measurement data of the sound velocity at a position of the receiving transducer array of the multi-beam echo sounder at the time t, and $c_{0est}(t)$ denotes an estimated value of the sound velocity at the position of the receiving transducer array of the multi-beam echo sounder at the time t; H denotes a measurement operator, which performs a calculation according to the sound ray tracing algorithm, and $Doa_{meas}(t)$ denotes a measurement value of a direction of arrival of each beam at the time t; and (5) obtaining an inversion value of an EOF coefficient in an optimization algorithm, according to the optimization model established in step (4), the time of arrival of the echo and the angle of arrival of the echo received in step (2), and a measurement value of the sound velocity at the position of the receiving transducer array; and further obtaining an estimation result of the sound velocity profile by using the formula (1).

2. The sound velocity profile inversion method based on the inverted multi-beam echo sounder according to claim 1, wherein in step (5), the optimization algorithm comprises a simulated annealing algorithm, a hill climbing algorithm, a particle swarm optimization algorithm, a genetic algorithm, and an ant colony algorithm.

3. A measurement system of an inverted multi-beam echo sounder, wherein the sound velocity profile inversion method according to claim 1 is applied to the measurement system.

4. The measurement system of an inverted multi-beam echo sounder according to claim 3, wherein in step (5), the optimization algorithm comprises a simulated annealing algorithm, a hill climbing algorithm, a particle swarm optimization algorithm, a genetic algorithm, and an ant colony algorithm.

5. A water temperature profile inversion method based on an inverted multi-beam echo sounder, comprising following steps:
(1) mounting the multi-beam echo sounder on an underwater submerged buoy or fixing the multi-beam echo sounder to a water bottom in an inverted manner, transmitting a beam to a water surface by a transmitting transducer array, and receiving an echo signal by a receiving transducer array;
(2) obtaining, by the multi-beam echo sounder, an angle of arrival of an echo and a time of arrival of the echo according to the received echo signal;
(3) obtaining a description method of a dimension reduction primary function of the sound velocity profile, by solving an Empirical Orthogonal Function (EOF) according to sound velocity profile prior information, wherein a sound velocity profile at a time t is expressed as:

$$c(z, t) = c_0(z) + \Delta c(z, t) \qquad (3)$$
$$= c_0(z) + \sum_{i=1}^{I} \alpha_i(t)\psi_i(z)$$

where in the formula (3), z denotes a depth; $c_0(z)$ denotes an average sound velocity at the depth z, and $\Delta c(z,t)$ denotes a disturbance quantity; i denotes an order of the EOF, $1 \leq i \leq I$, I denotes the total number of orders of the EOF, $\alpha_i(t)$ denotes a coefficient of the $i^{th}$-order EOF, and $\psi_i(z)$ denotes the $i^{th}$-order EOF;
(4) establishing an optimization model in combination with the EOF, a sound ray tracing algorithm, a surface sound velocity and multi-beam data:

$$\hat{\alpha}(t) = \underset{\alpha}{\mathrm{argmin}}(\|Toa_{meas}(t) - Toa_{est}(t)\|_2 + K\|c_{0meas}(t) - c_{0est}(t)\|_2) \qquad (4)$$
$$Toa_{est}(t) = \mathcal{H}[\alpha, Doa_{meas}(t)]$$

where in the formula (4), K denotes a weight coefficient, taking a value in [0,1]; $Toa_{meas}(t)$ denotes actual measurement data of a time of arrival of each beam at a time t, $Toa_{est}(t)$, denotes an estimated value of a time of arrival of each beam at the time 1, $c_{0meas}(t)$ denotes measurement data of the sound velocity at a position of the receiving transducer array of the multi-beam echo sounder at the time t, and $c_{0est}(t)$ denotes an estimated value of the sound velocity at the position of the receiving transducer array of the multi-beam echo sounder at the time t; H denotes a measurement operator, which performs a calculation according to the sound ray tracing algorithm, and $Doa_{meas}(t)$ denotes a measurement value of a direction of arrival of each beam at the time t;
(5) obtaining an inversion value of an EOF coefficient in an optimization algorithm, according to the optimization model established in step (4), the time of arrival of the echo and the angle of arrival of the echo received in step (2), and a measurement value of the sound velocity at the position of the receiving transducer array; and obtaining an estimation result of the sound velocity profile by using the formula (3); and
(6) calculating a water temperature profile of a measurement area according to an estimation value of the sound velocity profile in step (5).

6. The water temperature profile inversion method based on the inverted multi-beam echo sounder according to claim 5, wherein in step (5), the optimization algorithm comprises a simulated annealing algorithm, a hill climbing algorithm, a particle swarm optimization algorithm, a genetic algorithm, and an ant colony algorithm.

7. The water temperature profile inversion method based on the inverted multi-beam echo sounder according to claim 5, wherein in step (6), the water temperature profile of the measurement area is calculated by using a Mackenzie formula for a sound velocity, a Chen-Millero-Li formula for the sound velocity, a Dell Grosso formula for the sound velocity, a Leroy formula for the sound velocity, a Wilson accurate formula for the sound velocity, a simplified Wilson formula for the sound velocity, or a simplified EM Hierarchical formula for the sound velocity.

8. A measurement system of an inverted multi-beam echo sounder, wherein the water temperature profile inversion method according to claim 5 is applied to the measurement system.

9. The measurement system of an inverted multi-beam echo sounder according to claim 8, wherein in step (5), the optimization algorithm comprises a simulated annealing algorithm, a hill climbing algorithm, a particle swarm optimization algorithm, a genetic algorithm, and an ant colony algorithm.

10. The measurement system of an inverted multi-beam echo sounder according to claim 8, wherein in step (6), the water temperature profile of the measurement area is calculated by using a Mackenzie formula for a sound velocity, a Chen-Millero-Li formula for the sound velocity, a Dell Grosso formula for the sound velocity, a Leroy formula for the sound velocity, a Wilson accurate formula for the sound velocity, a simplified Wilson formula for the sound velocity, or a simplified EM Hierarchical formula for the sound velocity.

* * * * *